United States Patent [19]

Welp

[11] Patent Number: 4,842,076

[45] Date of Patent: Jun. 27, 1989

[54] POTATO HARVESTER

[75] Inventor: Johannes Welp, Damme/Dümmer, Fed. Rep. of Germany

[73] Assignee: Franz Grumme Landmaschinenfabrik GmbH & Co. KG, Damme, Fed. Rep. of Germany

[21] Appl. No.: 893,433

[22] Filed: Aug. 5, 1986

[30] Foreign Application Priority Data

Aug. 16, 1985 [DE] Fed. Rep. of Germany ....... 3529464

[51] Int. Cl.$^4$ ...................... A01D 33/02; A01D 17/22
[52] U.S. Cl. .................................... 171/124; 171/126; 171/130; 460/123; 460/904
[58] Field of Search .................... 171/10, 25, 124, 125, 171/126, 130, 131; 172/32, 33; 209/606, 617; 130/DIG. 7, 30 P; 56/16.4, 16.5, 16.6

[56] References Cited

U.S. PATENT DOCUMENTS

| Re. 25,668 | 10/1964 | Johnson | 130/30 P |
|---|---|---|---|
| 956,821 | 5/1910 | Nix | 171/124 |
| 1,199,703 | 9/1916 | Kendall | 130/DIG. 7 X |
| 1,554,376 | 9/1925 | Schrag | 171/125 |
| 1,662,467 | 3/1928 | Minshall | 130/DIG. 7 X |
| 2,656,921 | 10/1953 | Gray et al. | 130/30 P |
| 2,671,999 | 3/1954 | Hardigg | 171/131 |
| 4,382,471 | 5/1983 | Peterson | 171/124 |
| 4,407,370 | 10/1983 | Small et al. | 171/124 |

FOREIGN PATENT DOCUMENTS

| 1953084 | 4/1971 | Fed. Rep. of Germany | 171/130 |
|---|---|---|---|
| 2312111 | 1/1982 | Fed. Rep. of Germany | |
| 689046 | 3/1953 | United Kingdom | 130/DIG. 7 |

OTHER PUBLICATIONS

Maschinenfabrik Niewöhner GmbH & Co. KG, Literature for "Wühlmaus 2165".
Franz Grumme Landmaschinenfabrik, Literature for "Europa Standard", 1966.
Franz Grumme Landmaschninenfabrik, Literature for Model "SL 800", 12/1985.
Franz Grumme Landmaschinenfabrik, Literature for Model "MK 700 G/G5", 7/1980.
Franz Grumme Landmaschinenfabrik, Literature for Models "HL750G/HL750GS", 2/1980.
Franz Grumme Landmaschinenfabrik, Literature for Model "LK 650", 12/1985.

Primary Examiner—Robert A. Hafer
Assistant Examiner—Sam Rimell
Attorney, Agent, or Firm—Jordan and Hamburg

[57] ABSTRACT

A potato harvester comprises a screening conveyor belt following a lifting device, an elevator disposed after the screening conveyor belt, a haulm separating device and a stone separating device. The elevator is formed from a double conveyor having an internally rotating bar-type conveyor belt with narrow openings and an externally rotating bar-type conveyor belt with wide openings. The two conveyor belts rotate in the same direction and are guided parallel to one another at least in the region of the conveying run of the elevator. One bar-type conveyor belt is further equipped with transversely directed entrainment webs which divide the gap between the conveying runs of the two conveyors into conveying compartments.

7 Claims, 2 Drawing Sheets

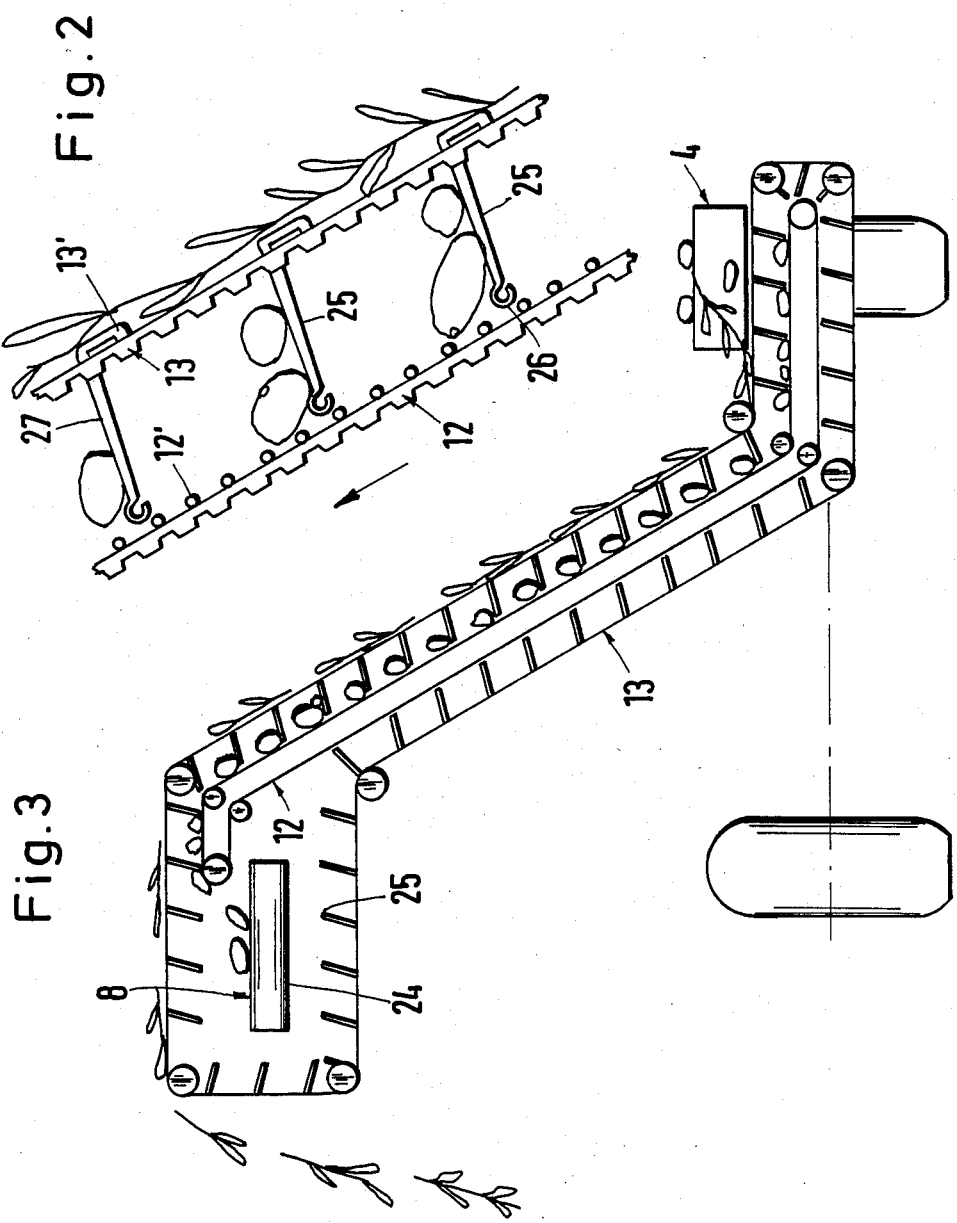

POTATO HARVESTER

The invention relates to a potato harvester.

It is known to provide a potato harvester having a screening conveyor belt following a lifting device, an elevator disposed after the screening conveyor belt, a haulm separating device and a stone separating device. The elevator and the haulm separating device form separate units which are also known in various designs. Ring conveyors, conveying wheels or side elevators are used as elevators. A first known haulm separating device provides a haulm plucking roll which, in co-operation with the upper end of the screening conveyor belt, conveys the haulms away between such haulm separating device and the end of the belt while potatoes and any entrained stones run over it. These are then fed by an elevator to a stone separating device. A second known haulm separating device provides a haulm elevator formed by a bar-type conveyor belt with narrow openings. This is disposed after the upper end of a screening conveyor belt and conveys potato haulms brought up by the screening conveyor belt, while potatoes and any entrained stones fall down between the upper end of the screening conveyor belt and the lower end of the haulm elevator onto an elevator or an intermediate preceding elevator - which feeds the potatoes and stones to a stone separating device. A third known haulm separating device consists of a double conveyor which is disposed after the screening belt and which comprises a bar-type conveyor belt having narrow-openings and rotating on the inside as a potato conveyor and a bar-type conveyor belt operating as a haulm conveyor with wide openings rotating outside in the same direction and guided parallel to the inside conveyor at least in the region of the conveying run of the double conveyor. The double conveyor is constructed in the form of an inclined conveyor rising slightly in the conveying direction and the elevator, which feeds potatoes separated from the haulms and any entrained stones to the stone separating device, is disposed after the end of the potato conveyor, either directly or following an intermediate conveyor.

It is an object of the invention to provide a potato harvester, the elevator of which is constructed in the form of a haulm separating device at the same time.

To this end, the elevator is formed from a double conveyor with one bar-type conveyor belt having narrow openings and rotating internally and another bar-type conveyor belt having wide openings which rotates externally in the same direction and which is guided parallel at least in the region of the conveying run of the elevator, and one of the bar-type conveyor belts is equipped with the transversely directed entrainment webs which divide the gap between the conveying runs into compartments.

In a potato harvester according to the invention, the elevator, which may be arranged immediately behind the upper end of the screening conveyor belt, takes over the function of the haulm separating device at the same time, leading to a considerable reduction in cost and in the structural size of the machine.

Specific embodiments of the invention will now be described by way of example and not by way of limitation with reference to the accompanying drawings.

BRIEF DESCRIPTION OF THE DRAWINGS

FIG. 2 is a broken away detail of the double conveyor forming the elevator; and

FIG. 3 is a simplified illustration of a potato harvester with the plane of rotation of the double conveyor aligned transversely to the direction of travel.

DESCRIPTION OF THE PREFERRED EMBODIMENTS

Figure 1:
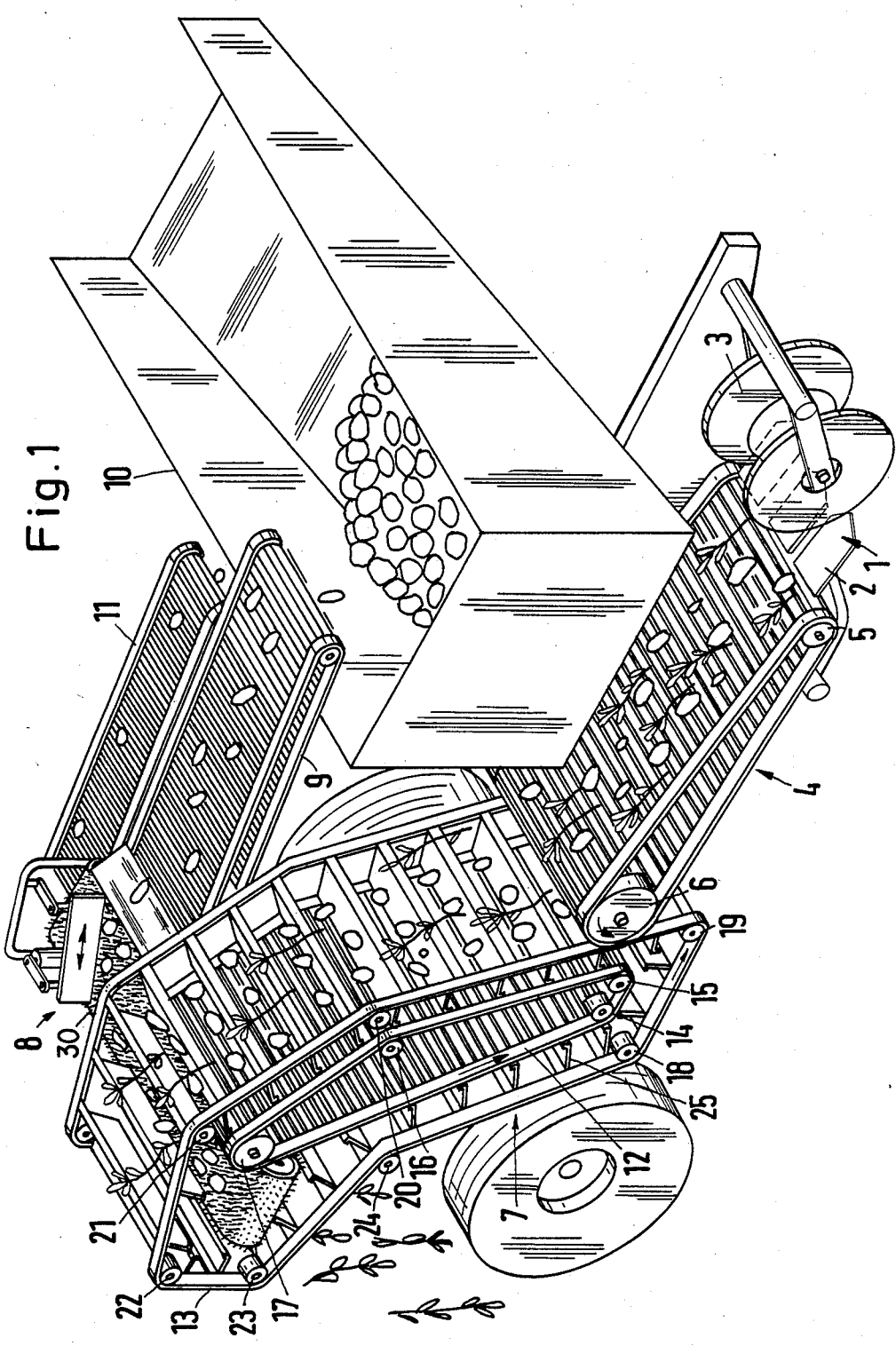
FIG. 1 is a simplified perspective general view of a potato harvester according to the invention.

The potato harvester illustrated in FIG. 1 comprises a lifting device 1 which is formed from lifting blades 2 and a mound drum 3 travelling in front of the blades 2. A screening conveyor belt 4 follows the lifting device 1 and is constructed in the form of a bar-type conveyor belt which rotates around guide rollers 5 and guide and drive rollers 6, the conveyor belt 4 being endlessly driven. An elevator 7 directly follows the upper or rear end of the screening conveyor belt 4 and forms a haulm separating device at the same time. A stone separating device 8 follows and transfers the potatoes, separated from stones, onto a conveyor belt 9 and is then transferred to a storage bin 10. The separated stones are deposited directly onto the ground or delivered to a conveyor 11 which conveys the stones to a non-illustrated collecting bin.

The machine may be attached, as a trailer, to an agricultural tractor or the like towing vehicle or it may be constructed in the form of a self-propelled machine.

Instead of the illustrated single-row model, a double-row model may also be provided. For the individual units of the machine, drives are provided as far as necessary, which are formed from individual drive motors, for example hydraulic motors, or from transmissions which are set in operation from the towing vehicle.

The elevator 7 is formed from a double conveyor which comprises a bar-type conveyor belt 12 with narrow openings, rotating internally as a potato conveyor and a bar-type conveyor belt 13 with wide openings, rotating externally in the same direction and guided parallel at least in the region of the conveying run of the elevator 7, and operating as a haulm conveyor. The bar-type conveyor belt 12 rotates around guide rollers 14, 15, 16 as well as guide and drive rollers 17. The bar-type conveyor belt 13 rotates around guide rollers 18, 19, 20, 21, 22, 23 and 24 of which the guide rollers 22, for example, may form drive rollers at the same time. The conveying strand run of the bar-type conveyor belt 13 extends between the guide rollers 19 and 22 and the conveying run of the bar-type conveyor belt 12 extends between the guide rollers 15 to 17.

In the region between the conveyor rollers 15 and 17, the bar-type conveyor belts 12, 13 are guided parallel to one another. The stone separating device 8 is disposed immediately after the upper end of the bar-type conveyor belt 12, and includes a transversely extending bristle belt 30. The device 8 receives potatoes and stones elevated by the conveying run of the elevator 7 in order to carry out a stone separating operation. The bristle belt 30 is situated inside a loop in the upper region of the bar-type conveyor belt 13 and its discharge extends outside the region of the loop.

One of the bar-type conveyor belts 12 or 13, preferably the bar-type conveyor belt 13 forming the haulm conveyor, is equipped at its side adjacent to the other bar-type conveyor belt with transversely directed entrainment webs 25 which divide the gap between the conveying runs of the two bar-type conveyor belts 12, 13 into bucket-like compartments. The entrainment webs 25 are formed by rubber flights which end, at their free marginal edges, each in a resilient lip 26 rolled inwards in the form of an eye. The conveying surface 27 of the entrainment webs 25 forms an angle slightly exceeding 90° with the conveying surface of the bar-type conveyor belt 12 defined by the bars 12' in the region of its conveying run. The oblique decline of this conveying surface 27 towards the bar-type conveyor belt 12 is adjusted to an angle of inclination which imparts to the potatoes contained in the bucket compartments a tendency to move towards the conveying surface of the bar-type conveyor belt 12. As a result, the potatoes are prevented from falling out of the compartments and, in the event of a fixed difference, or a difference which is variable in stages or adjustably variable, in the speeds of rotation of the bar-type conveyor belts 12 and 13, which difference is possible according to the invention, rolling and therefore screening or cleaning effects are achieved, such as are desired according to the soil conditions. With light soils somewhat higher speed of rotation is preferred for the bar-type conveyor belt 12 such that a slight rolling motion in a clockwise direction, as viewed in FIG. 3, is imparted to the potatoes in the compartments and this may be sufficient for cleaning the potatoes. In the case of heavy soils, a somewhat higher speed of rotation of the bar-type conveyor belt 13 may be provided in order to obtain an intensified rolling process taking place in a counterclockwise direction, as viewed in FIG. 2, such that a more aggressive potato cleaning action is achieved. In the case of sandy soils, the screening effect through the screening conveyor belt 4 may be sufficient for cleaning so that the two bar-type conveyor belts 12, 13 may also have the same speed of rotation. The ratio of the speeds of rotation of the bar-type conveyor belts 12, 13 to one another should assume a value which lies in the range between 0.8 and 1.2.

Whereas the bars 12' of the bar-type conveyor belt 12 have a mutual spacing of the order of magnitude of about 35 to 44 mm and are thus set with narrow openings, the bars 13' of the bar-type conveyor belt 13 have a mutual spacing which may be in the range from 120 to 240 mm and is preferably about 160 mm. The entrainment webs 25 preferably have a mutual spacing which corresponds to the spacing of the bars 13' of the bar-type conveyor belt 13.

In the embodiment shown in FIG. 1, the plane of rotation of the elevator extends parallel to the direction of travel of the machine, but it is also possible to align this plane of rotation transversely to the direction of travel as the diagrammatic illustration in FIG. 3 shows. Such an embodiment enables the potato haulms to be dumped in rows for example or to be dumped directly into a collecting bin travelling parallel with the machine.

With a steep setting of the elevator 7, in the interests of gaining height, the bar-type conveyor belts 12, 13 co-operate in the conveying of potatoes and stones if, as preferred, the entrainment webs 25 are secured to the bar-type conveyor belt 13 which alone participates in conveying the haulms. The main conveying work is done by the entrainment webs 25 with which the bar-type conveyor belt 12 is essentially associated only as a boundary, forming the bottoms of the bucket compartments.

We claim:

1. In a potato harvester comprising an inside conveyor belt means, inside support means for supporting said inside conveyor belt means for movement about an inner path of travel, said inner path of travel defining an enclosed first area bounded by said inside conveyor belt means, a haulm-separating outside conveyor belt means, outside support means for supporting said outside conveyor belt means for movement about an outer path of travel, said outer path of travel defining an enclosed second area bounded by said outside conveyor belt means, said inside conveyor belt means being disposed inside said outside conveyor belt means such that said enclosed first area is disposed within said enclosed second area, each of said inside and outside supporting means supporting said inside and outside conveyor belt means along an inclined run disposed along said respective inner and outer paths of travel, said inside and outside conveyor belt means at said inclined run being parallel to and spaced from one another, one of said inside or outside conveyor belt means having transverse entrainment elements which extend generally transversely from said one conveyor belt means into said space between said inside and outside conveyor belt means at said inclined run, said entrainment elements being spaced from one another and defining entrainment compartments between successive entrainment elements and between said inside and outside conveyor belt means moving in the same direction such that said entrainment compartments move upwardly along said inclined run, said outside conveyor belt means separating the haulms from the harvested potatoes and conveying the separated haulms up said inclined run, said outside conveyor belt means having spaced bars defining openings, said inclined run of said inside conveyor belt means generally underlying said inclined run of said outside conveyor belt means such that the harvested potatoes from which the haulms have been separated pass through said openings in said outside conveyor belt means into said entrainment compartments and are carried up said inclined run within said entrainment compartments.

2. A potato harvester comprising a lifting means for lifting the potatoes from the ground, a screening means receiving the potatoes from the lifting means, and elevator means receiving the potatoes from said screening means, said elevator means comprising an inside conveyor belt and inside support means for supporting said inside conveyor belt for movement about an inner path of travel, said inner path of travel defining an enclosed first area bounded by said inside conveyor belt, said elevator means further comprising an outside conveyor belt and outside support means for supporting said outside conveyor belt for movement about an outer path of travel, said outer path of travel defining an enclosed second area bounded by said outside conveyor belt, said inside conveyor belt being disposed inside said outside conveyor belt such that said enclosed first area is disposed within said enclosed second area, each of said inside and outside supporting means supporting said inside and outside conveyor belts along an inclined run disposed along said inner and outer paths of travel, said inside and outside conveyor belts at said inclined run being parallel to and spaced from one another, one of said inside or outside conveyor belts having transverse entrainment elements which extend generally transversely from said one conveyor belt into said space between said inside and outside conveyor belts at said inclined run, said entrainment elements being spaced from one another and defining entrainment compartments between successive entrainment elements and between said inside and outside conveyor belts along said inclined run, said first and second conveyor belts moving in the same direction such that said entrainment compartments move upwardly along said inclined run, said outside conveyor belt being a bar-type conveyor belt having openings of a first width and which separates the haulms from the harvested potatoes and conveys the separated haulms up said inclined run, said inside conveyor belt being a bar-type conveyor belt having bar openings of a second width less than said first width, said inclined run of said inside conveyor belt generally underlying said inclined run of said outside conveyor belt such that the harvested potatoes from which the haulms have been separated pass through said openings in said outside conveyor belt into said entrainment compartments and are carried up said inclined run within said entrainment compartments.

3. A potato harvester according to claim 2 wherein said enclosed second area has a first area part within which said inside conveyor belt is disposed, said enclosed second area having a second area part disposed outside of said enclosed first area, and a conveyor means having a receiving-end portion disposed within said second area part for receiving said potatoes from said entrainment compartment and conveying said potatoes in a direction generally transversely of the direction said potatoes were conveyed when in said entrainment compartments.

4. A potato harvester according to claim 2 wherein said inside support means comprise a plurality of first roller elements having generally parallel first axes of rotation, said inside support means supporting said inside belt at a belt-discharge area, and stone-separation conveyor means juxtaposed to said beltdischarge area for receiving potatoes and stones carried in said entrainment compartments, said stone-separation conveyor means having a receiving end portion which extends within said enclosed second area and outside of said enclosed first area, said stoneseparation conveyor means comprising an endless belt passing over a plurality of second roller elements having generally parallel axes of rotation which are substantially perpendicular to said first axes of rotation.

5. A potato harvester according to claim 4 wherein said receiving-end portion of said stone-separation conveying means underlies said belt-discharge area such that the potatoes and stones fall by gravity from said belt-discharge area onto said underlying receiving end portion of said stone-separation conveying means.

6. A potato harvester according to claim 2 wherein said entrainment elements extend from said outside conveyor belt, said entrainment elements having terminating ends which are juxtaposed to said inside conveyor belt at said inclined run.

7. A potato harvester comprising delivery means for delivering potatoes from the ground, elevator means receiving the potatoes from said delivery means, said elevator means comprising an endless inside conveyor belt defining an enclosed first area, inside support means supporting said inside conveyor belt for movement about an endless inner path of travel, said elevator means further comprising an endless outside conveyor belt defining an enclosed second area, outside support means supporting said outside conveyor belt for movement about an endless outer path of travel, said inside conveyor belt being disposed inside said outside conveyor belt such that said enclosed first area is disposed within said enclosed second area, each of said inside and outside supporting means supporting said inside and outside conveyor belts along an inclined run disposed along said respective inner and outer paths of travel, said inside and outside conveyor belts at said inclined run being parallel to and spaced from one another, one of said inside or outside conveyor belts having transverse entrainment elements which extend generally transversely from said one conveyor belt into said space between said inside and outside conveyor belts at said inclined run, said entrainment elements being spaced from one another and defining entrainment compartments between successive entrainment elements and between said inside and outside conveyor belts along said inclined run, said first and second conveyor belts moving in the same direction such that said entrainment compartments move upwardly along said inclined run, said outside conveyor belt being a bar-type conveyor belt having openings of a first width and which separates the haulms from the harvested potatoes and conveys the separated haulms up said inclined run, said inside conveyor belt being a bar-type conveyor belt having bar openings of a second width less than said first width, said inclined run of said inside conveyor belt generally underlying said inclined run of said outside conveyor belt such that the harvested potatoes from which the haulms have been separated pass through said openings in said outside conveyor belt into said entrainment compartments and are carried up said inclined run within said entrainment compartments, said enclosed second area having a first area part within which said inside conveyor belt is disposed, said enclosed second area having a second area part disposed outside of said enclosed first area, and a stone-separation conveyor means having a receiving-end portion disposed within said second area part for receiving said potatoes and stones from said entrainment compartment and conveying said potatoes and stones in a direction generally transversely of the direction said potatoes and stones were conveyed when in said entrainment compartments.

* * * * *